(12) United States Patent
Liang

(10) Patent No.: US 8,795,866 B2
(45) Date of Patent: Aug. 5, 2014

(54) BATTERY COVER ASSEMBLY FOR PORTABLE ELECTRONIC DEVICE

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 961 days.

(21) Appl. No.: 12/819,301

(22) Filed: Jun. 21, 2010

(65) Prior Publication Data
US 2011/0244290 A1    Oct. 6, 2011

(30) Foreign Application Priority Data
Apr. 2, 2010    (CN) .......................... 2010 1 0138736

(51) Int. Cl.
*H01M 2/10*    (2006.01)

(52) U.S. Cl.
USPC .............................................. 429/97; 429/96

(58) Field of Classification Search
USPC ........................................................... 429/97
See application file for complete search history.

(56) References Cited

U.S. PATENT DOCUMENTS

2004/0080916 A1*    4/2004    Hsu et al. ...................... 361/727
2011/0050164 A1*    3/2011    Partovi et al. ................. 320/108

* cited by examiner

*Primary Examiner* — Barbara Gilliam
*Assistant Examiner* — Gary Harris
(74) *Attorney, Agent, or Firm* — Novak Druce Connolly Bove + Quigg LLP

(57) ABSTRACT

A portable electronic device includes a housing, a battery cover, a positioning element, and a latching element. The positioning element is mounted on the housing. The latching element is retained by the positioning element and configured for securing the battery cover to the housing. The battery cover is electrically connected to the positioning element by the latching element.

9 Claims, 9 Drawing Sheets

BATTERY COVER ASSEMBLY FOR PORTABLE ELECTRONIC DEVICE

BACKGROUND

1. Technical Field

The exemplary disclosure generally relates to battery cover assemblies and, particularly, relates to a battery cover assembly and a portable electronic device utilizing the assembly.

2. Description of Related Art

Batteries are widely used in portable electronic devices, such as personal digital assistants (PDAs), and mobile phones. Batteries are received in electronic devices, and battery covers are provided to connect with the housings of the electronic devices to secure the batteries. Batteries are replaced by opening the battery covers.

Although battery cover assemblies are simple, the batteries may be held very securely between the battery cover and the housing of the mobile phone making the removal of the battery, at times, very difficult.

Therefore, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
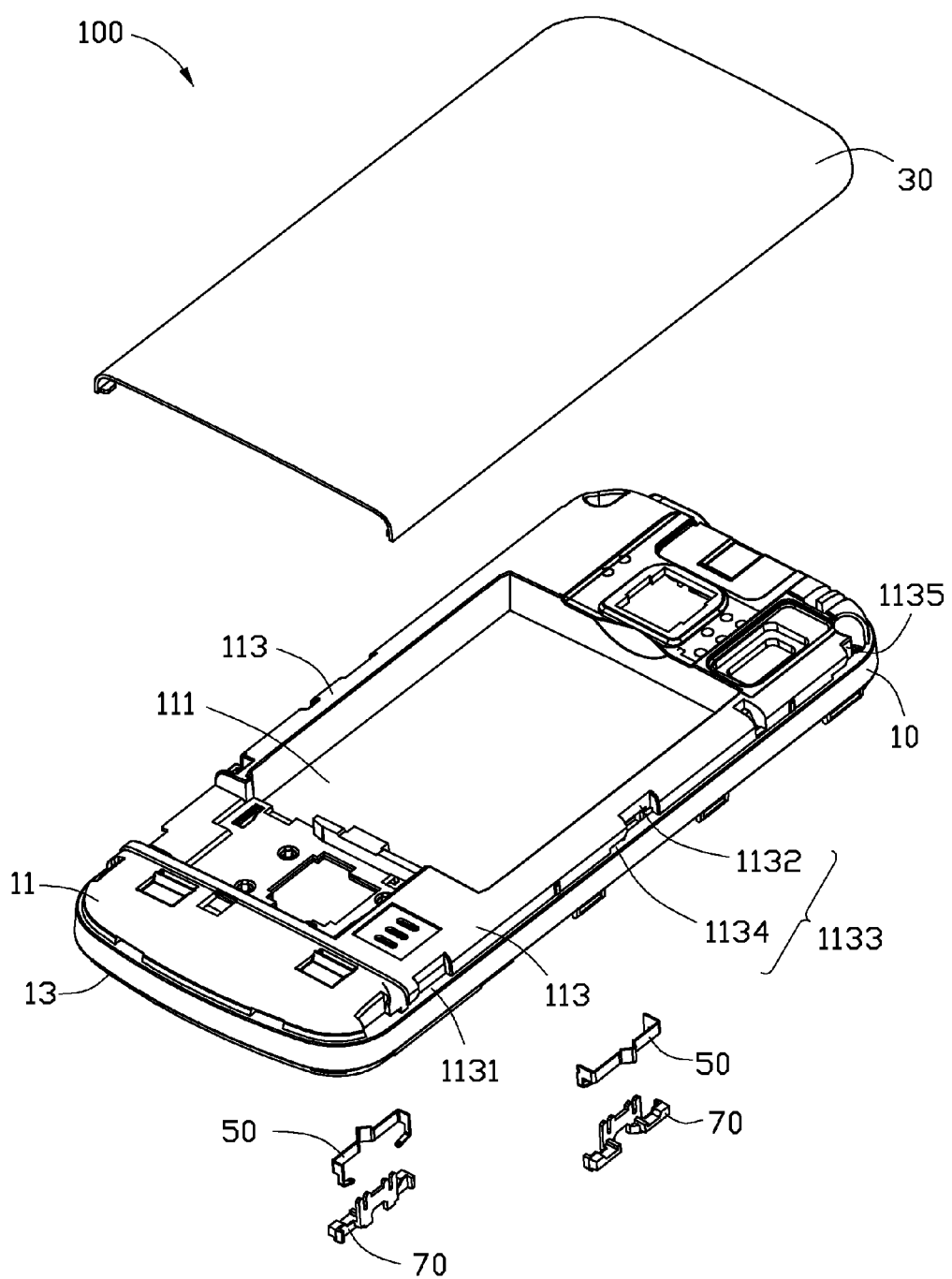
FIG. 1 is a partially exploded, isometric view of a portable electronic device employing a battery cover assembly in accordance with an exemplary embodiment.

FIG. 1 shows an exemplary embodiment of a portable electronic device 100, such as a cellular phone, a game player, or any electronic device, where a battery is required. The portable electronic device 100 includes a housing 10, a removable battery cover 30, two latching elements 50, and two positioning elements 70. The latching elements 50 and the positioning elements 70 are mounted on the housing 10. Each latching element 50 is retained by a corresponding positioning element 70 and configured to secure the battery cover 30 to the housing 10.

The housing 10 includes a first surface 11 and a second surface 13 opposite to the first surface 11. The first surface 11 defines a battery compartment 111 to receive a battery (not illustrated) for powering the portable electronic device 100. The housing 11 includes two opposite sidewalls 113. Each sidewall 113 defines a first latching slot 1131, a latching groove 1133, and a second latching slot 1135. The latching groove 1133 is defined between the first latching slot 1131 and the second latching slot 1135. The latching groove 1133 includes a through hole 1132 and an opening 1134.

Figure 2:
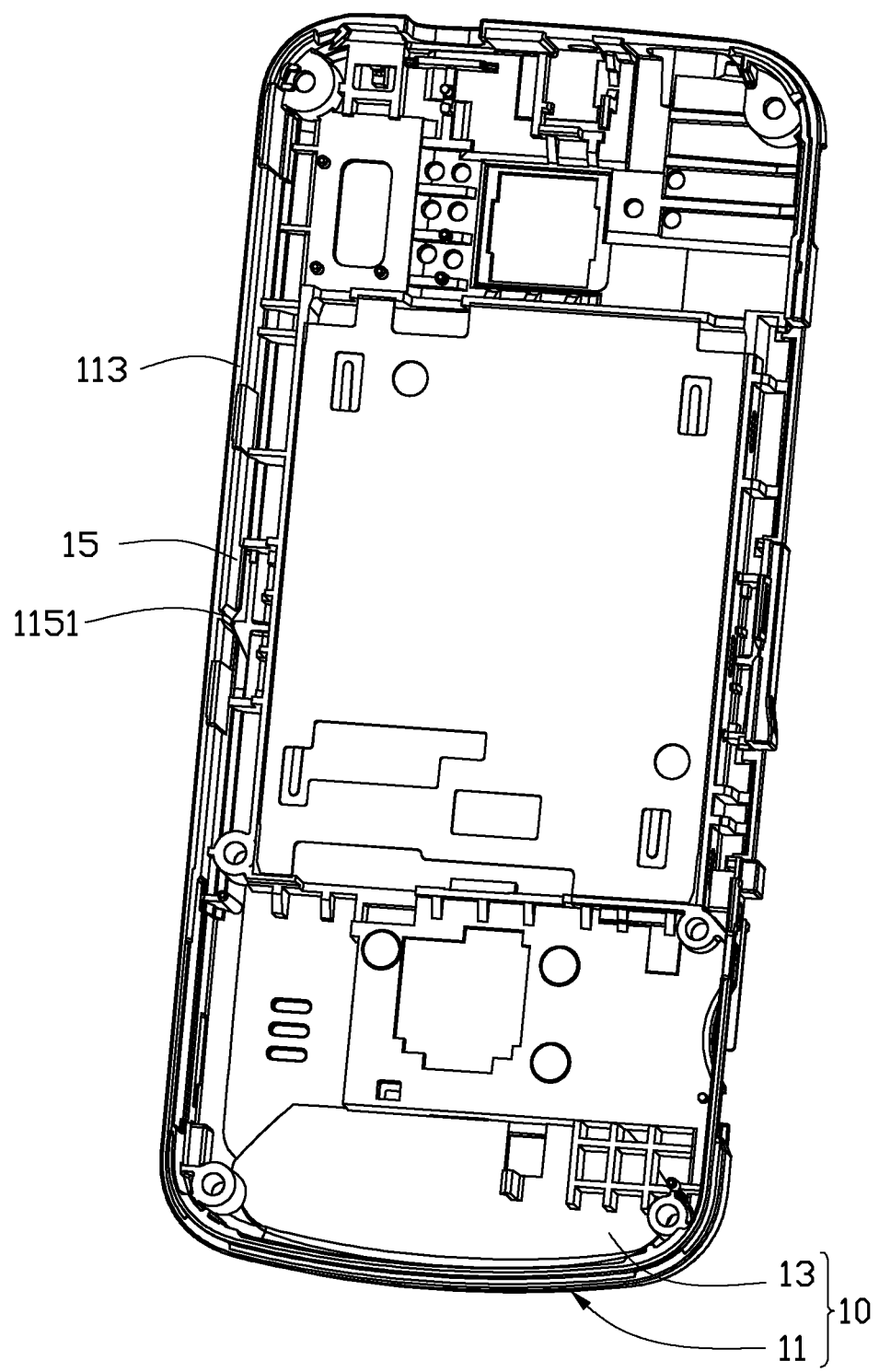
FIG. 2 is an isometric view of a base of the portable electronic device.
Figure 3:
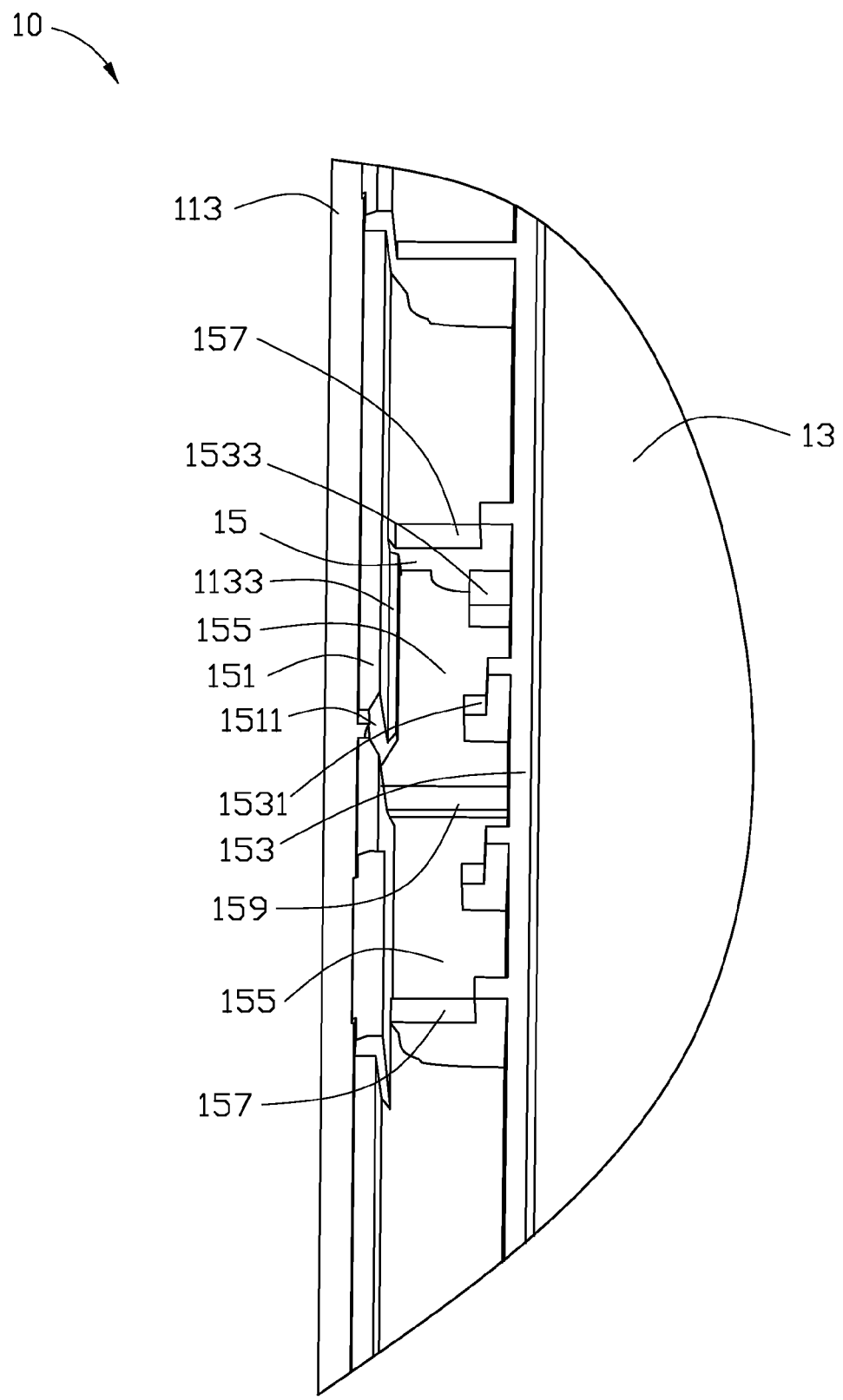
FIG. 3 is an enlarged view of part of base in FIG. 2.

Referring to FIGS. 2 and 3, each sidewall 113 defines a receiving slot 15. The receiving slot 15 is cooperatively surrounded by a first resisting plate 151, an opposite second resisting plate 153, two stepped supporting projections 157. A rib 159 projects from the bottom surface of the receiving slot 15 so that the receiving slot 15 is divided into two cavities 155. The interior of the first resisting plate 151 defines an arcuate cutout 1511 communicating with the latching groove 1133. A latching block 1531 and a resisting block 1533 project from the bottom surface of each cavity 155 and connect to the second resisting plate 153.

Figure 4:
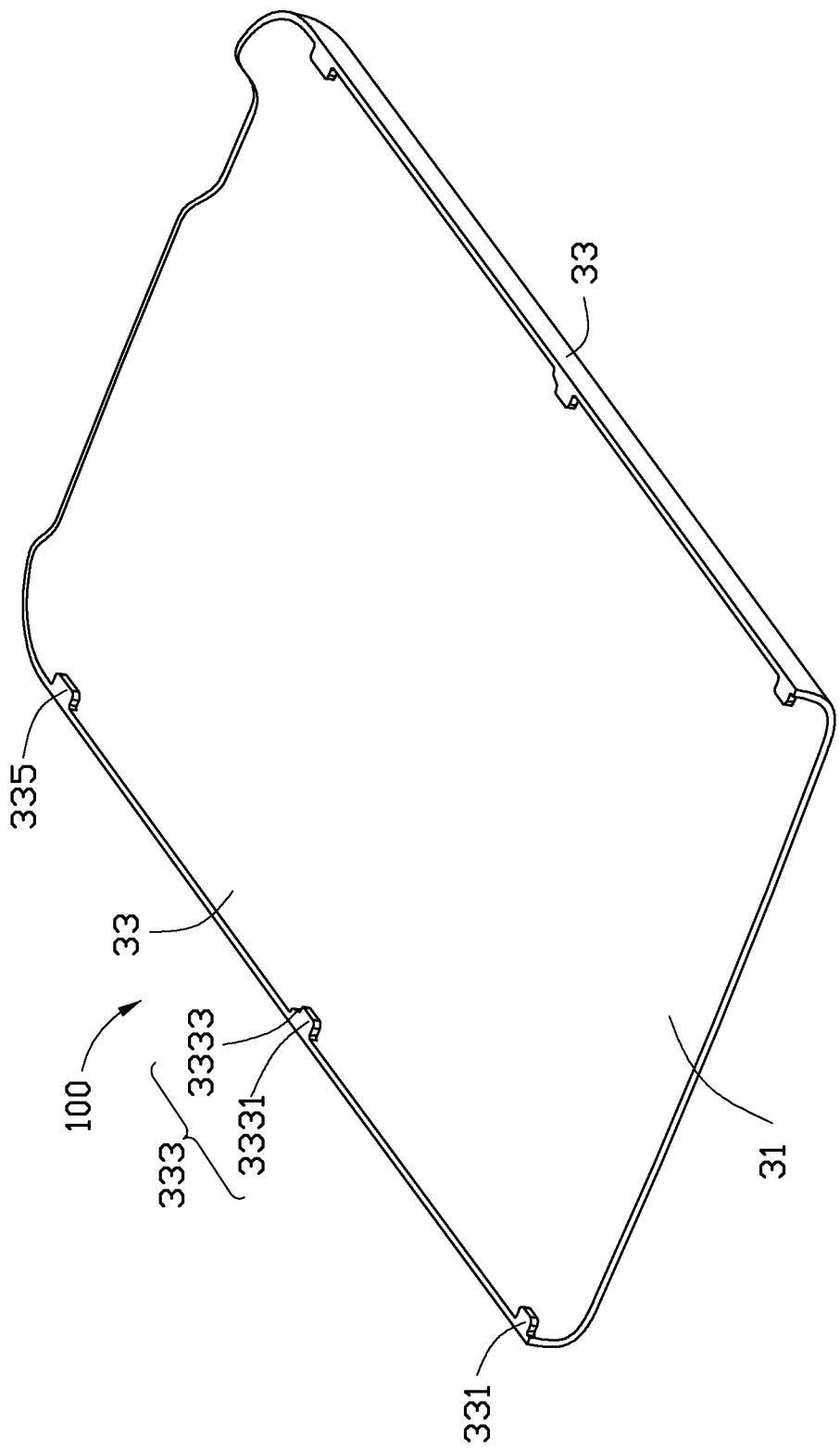
FIG. 4 is an isometric view of a battery cover of the portable electronic device.

Referring to FIG. 4, the battery cover includes a base plate 31 and two side plates 33 substantially perpendicularly extending from the base plate 31. A first protrusion 331, a projection 333, and a second protrusion 335 respectively extend inwards from each side plate 33. The first and second protrusion 331 and 335, and the projection 333 are substantially parallel to the base plate 31. The projection 333 includes a latching portion 3331 and a guiding surface 3333 formed on one side of the latching portion 3331.

Figure 5:
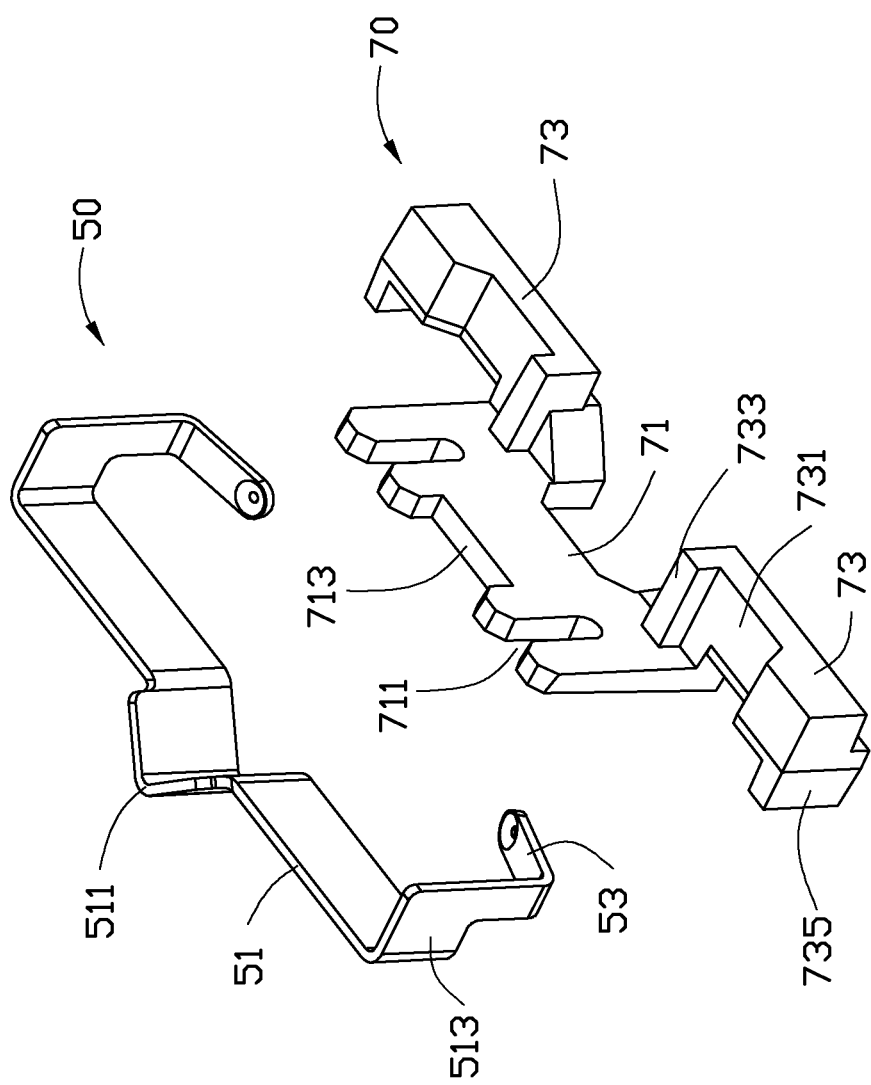
FIG. 5 is an enlarged, isometric view of a latching element and a positioning element of the portable electronic device.

Referring to FIG. 5, the latching element 50 includes a base portion 51 and two contacting portions 53 integrally formed together. To stop a corresponding projection 333 of the battery cover 30, a stopping protrusion 511 projects from the base portion 51. In assembly, two ends of the base portion 51 are buckled in a direction opposite to the stopping protrusion 511 and form two resisting portions 513. Acting as two arms of the latching element 50, each contacting portion 53 forms at an angle with a corresponding resisting portion 513.

The positioning element 70 includes a fixing portion 71 and two supporting portions 73. The fixing portion 71 is a substantially flat plate. The two supporting portions 73 respectively project from two ends of the flat plate and extend in opposite directions. The other end of the fixing portion 71 defines two positioning grooves 711 and a receiving groove 713 therein. A size of each positioning groove 711 corresponds to that of a corresponding latching block 1531. Each supporting portion 73 defines a positioning groove 731 therein. A supporting block 735 projects from the supporting portion 73.

Figure 6:
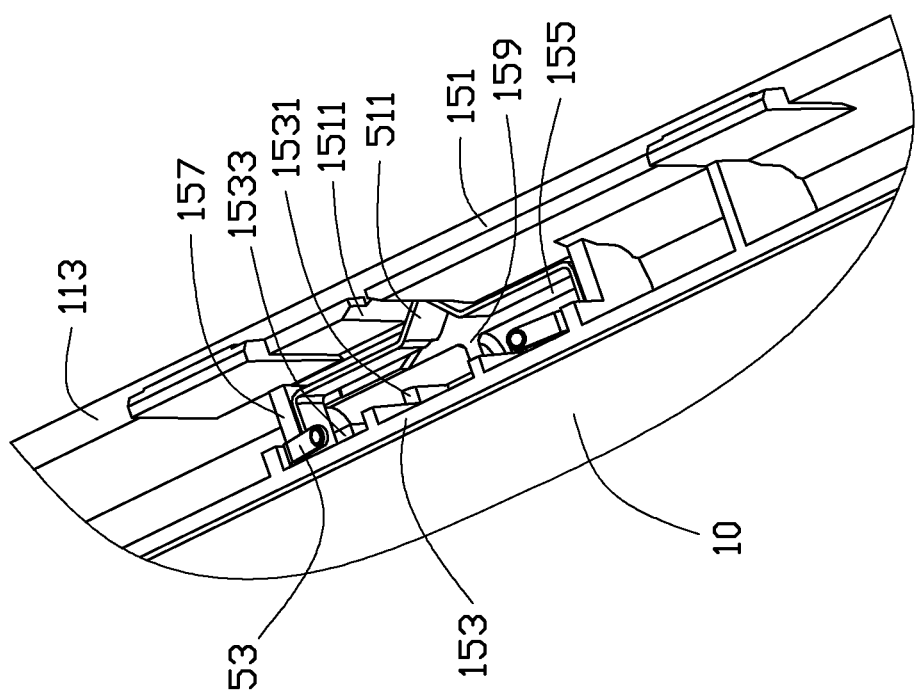
FIG. 6 is an assembled view of a latching element being attached to the housing.
Figure 7:
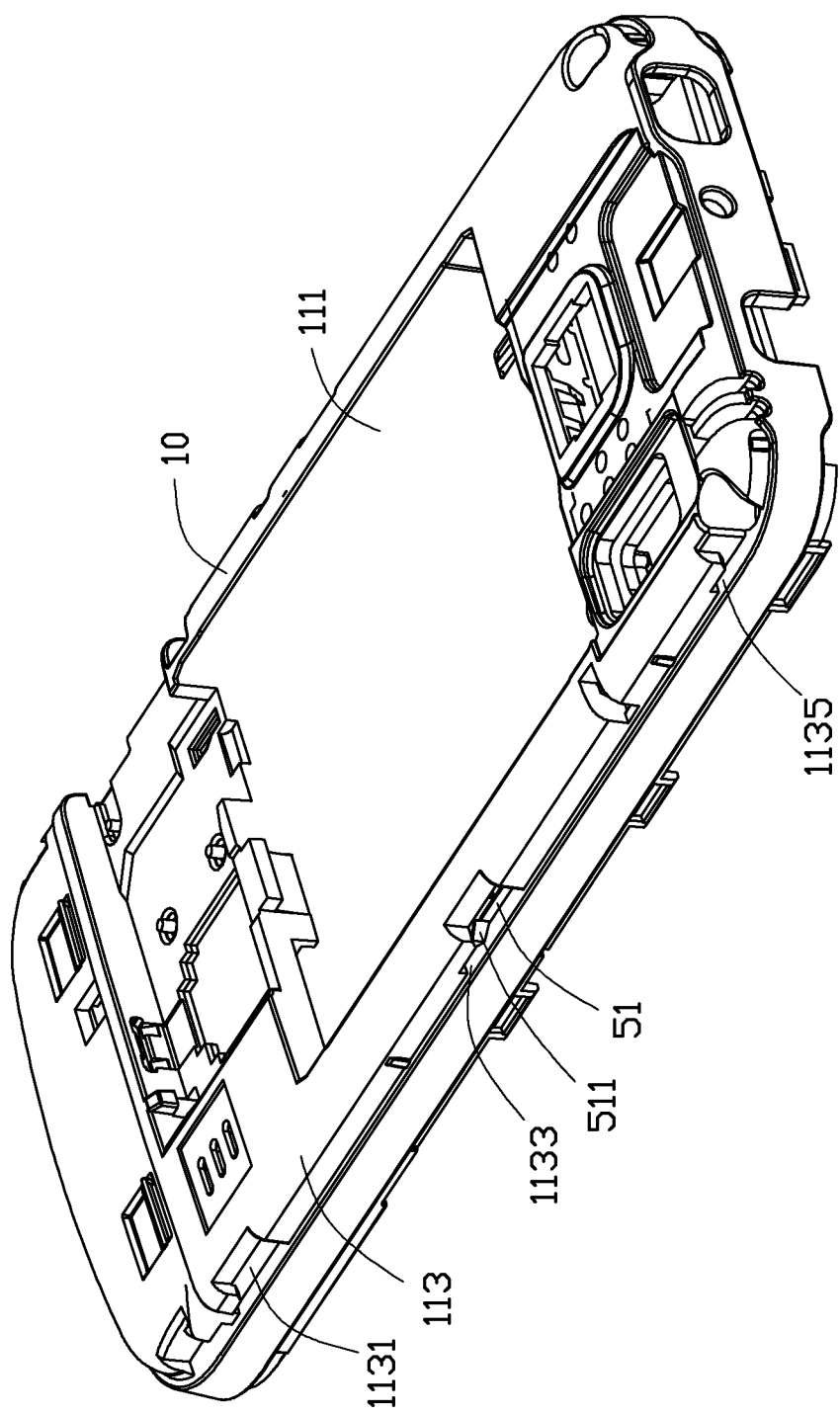
FIG. 7 is an isometric view of a positioning element being mounted on the housing.
Figure 8:
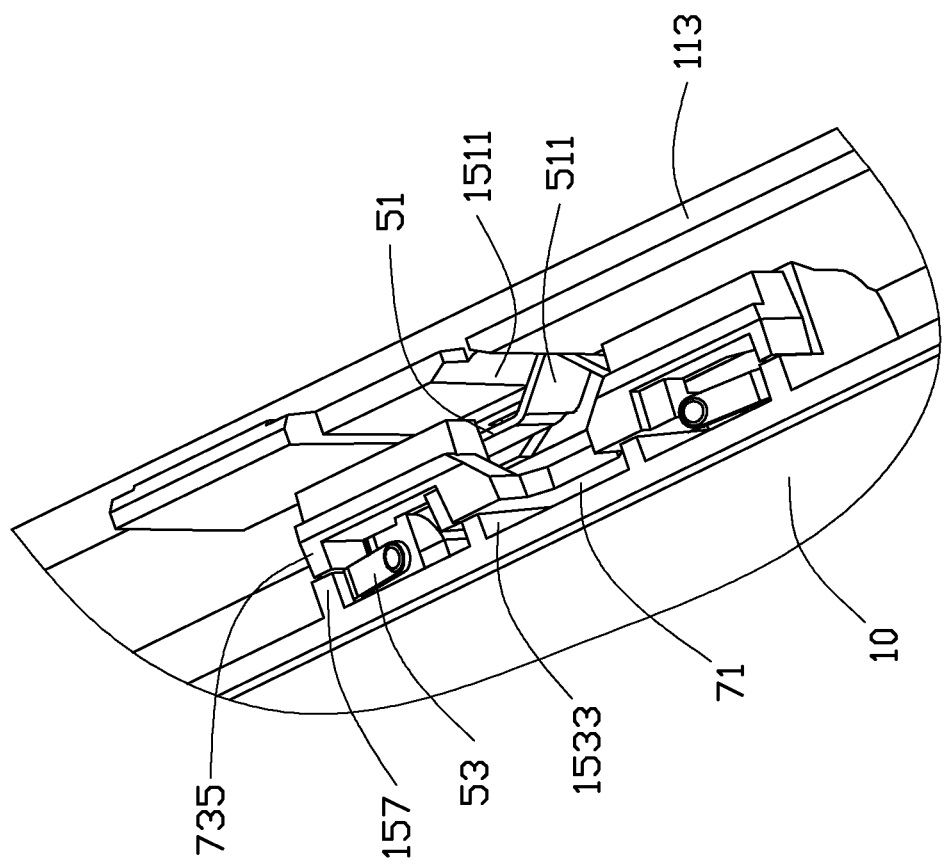
FIG. 8 is an enlarged view of a latching element and a positioning element being attached to the housing of FIG. 3.

Referring to FIGS. 6 and 7, during assembly, one of the latching elements 50 is received in a corresponding receiving slot 15. The stopping protrusion 511 is received in the cutout 1511 and extends into the latching groove 1133 of the housing 10. The two resisting portions 513 respectively resist the supporting projections 157 and are supported by the resisting blocks 1533. The two contacting portions 53 each extend beyond the second resisting plate 153. One of the positioning elements 70 is mounted on the housing 10 to retain the latching element 50. The fixing portion 71 is inserted into the receiving slot 15. The latching blocks 1531 are respectively received in the positioning grooves 711. The supporting blocks 735 are respectively engaged with the stepped supporting projections 157. The latching element 50 is retained by the positioning element 70, as shown in FIG. 8. The method of assembling the other latching element 50 and the other positioning element 70 is substantially the same.

Figure 9:
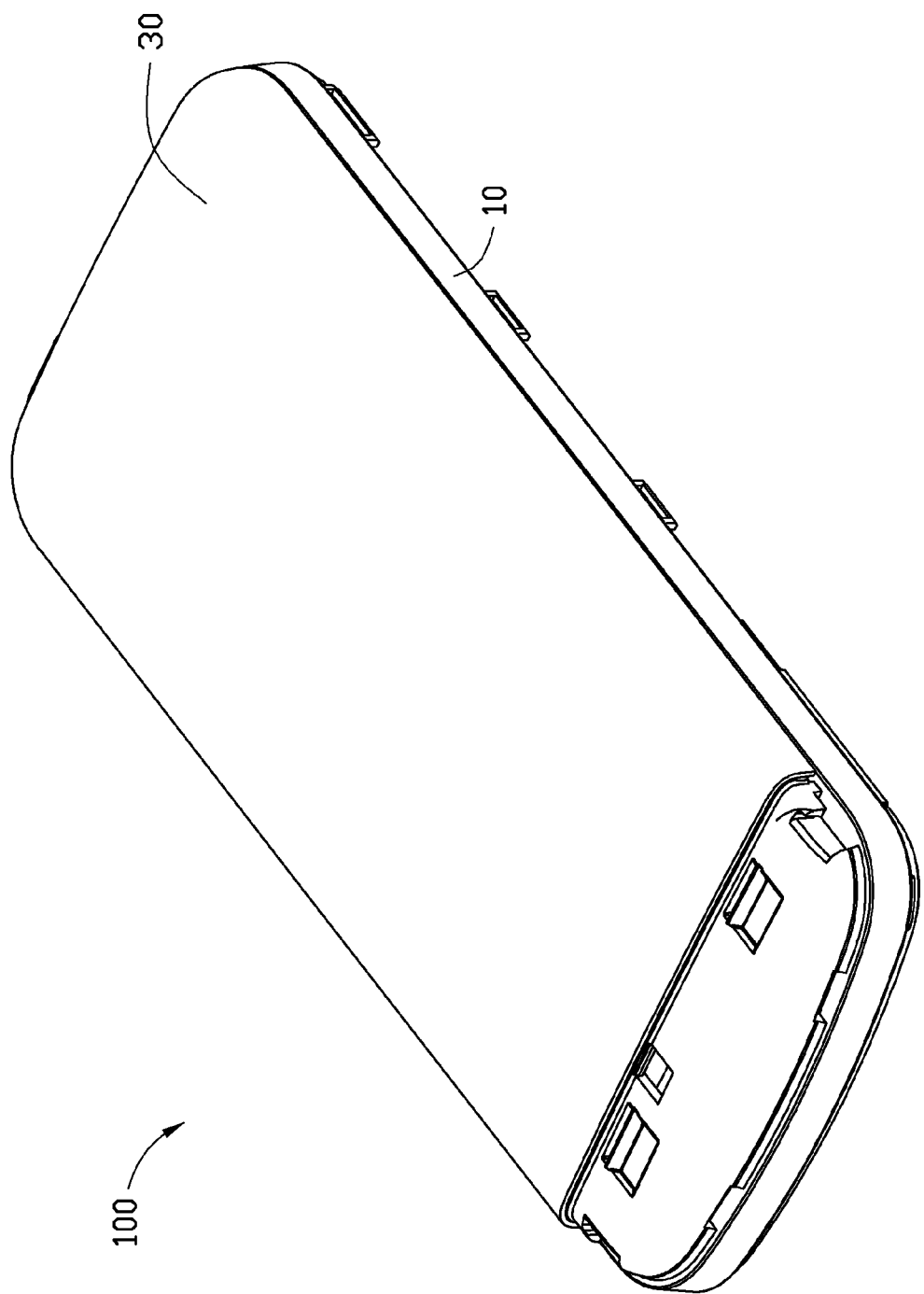
FIG. 9 is an assembled, isometric view of the portable electronic device.

The battery cover 30 is attached to and pushed by external forces to move along the housing 10, the first protrusions 331 are respectively received in the first latching slots 1131. The latching portions 3331 of the projections 333 each resist a corresponding stopping protrusion 511. The battery cover 30 is further pushed, allowing the projections 333 each to move and pass a corresponding stopping protrusion 511, the second protrusions 335 are respectively received in the second latching slots 1135. Thus, the portable electronic device 100 is assembled, as shown in FIG. 9.

The latching elements 50 each are retained by a corresponding positioning element 70, the battery cover 30 is secured by the latching elements 50, thus the portable electronic device 100 is easy to assemble or disassemble. Furthermore, when the battery cover 30, the latching elements 50, and the positioning elements 70 are made of conductive materials and the positioning elements 70 connect to grounding pads of a printed circuit board (PCB, not illustrated), the battery cover 30, the latching elements 50, and the positioning elements 70 together form a conductive path to remove the electromagnetic interference and electrostatic interference.

When a battery is to be replaced or installed, the battery cover 30 is pushed to move along the housing 10, the resisting surfaces 3333 resist the corresponding stopping projections 511. The battery cover 30 is further pushed, the resisting surfaces 3333 move along the stopping projections 511 and the latching portions 3331 pass the corresponding stopping projections 511, thus, the battery cover 30 can be removed from the housing 10.

It is to be understood that the number of the latching elements 50 and the latching elements 70 can be varied, that is, the number can be one or more than two.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
   a housing defining a latching groove and a receiving slot;
   a battery cover forming a projection;
   a positioning element; and
   a latching element detachably received in the receiving slot of the housing, the latching element and the positioning element being two separate elements, the positioning element detachably assembled to the receiving slot of the housing to prevent the latching element from separating from the housing, the latching element extending into the latching groove and latching with the projection to secure the battery cover to the housing; the battery cover electrically connecting to the latching element and the positioning element.

2. The portable electronic device as claimed in claim 1, wherein the latching element forms a stopping protrusion, the projection includes a latching portion, the latching portion resists the stopping protrusion.

3. The portable electronic device as claimed in claim 2, wherein the housing defines a cutout communicating with the latching groove, in which the projection is received, the stopping protrusion is received in the cutout and extends into the latching groove.

4. The portable electronic device as claimed in claim 3, wherein the housing includes a first resisting plate and a second resisting plate and the receiving slot is defined between the first and second resisting plates, the cutout is defined in the first resisting plate.

5. The portable electronic device as claimed in claim 4, wherein the positioning element includes a fixing portion and two supporting portions extending from the fixing portion to resist the latching element, the fixing portion defines at least one positioning groove, at least one latching block projects from the bottom surface of the receiving slot, the latching block is received in the positioning groove.

6. The portable electronic device as claimed in claim 4, wherein two stepped supporting projections project from the bottom surface of the receiving slot, a supporting block projects from each supporting portion, the supporting portions engage the supporting projections.

7. The portable electronic device as claimed in claim 4, wherein a rib projects from the bottom surface of the receiving slot so that the receiving slot is divided into two cavities by the rib, a resisting block projects from each bottom surface of the cavities, the latching element resists the resisting blocks.

8. The portable electronic device as claimed in claim 4, wherein the projection includes a guiding surface formed one side of the latching portion, the guiding surface guides the projection in disassembly.

9. A portable electronic device comprising:
   a housing defining a first latching slot, a latching groove and a second latching slot at each of opposite sides thereof, the latching groove defined between the first latching slot and the second latching slot;
   a battery cover forming a first protrusion, a projection and a second protrusion at each of opposite sides thereof;
   a positioning element; and
   a latching element detachably received in the receiving slot of the housing, the latching element and the positioning element being two separate elements, the positioning element detachably assembled to the receiving slot of the housing to prevent the latching element from separating from the housing, the latching element extending into the latching groove, the first protrusion latched in the first latching slot, the second protrusion latched in the second latching slot, and the latching element latching with the projection, to secure the battery cover to the housing; the battery cover electrically connecting to the latching element and the positioning element.

* * * * *